United States Patent Office.

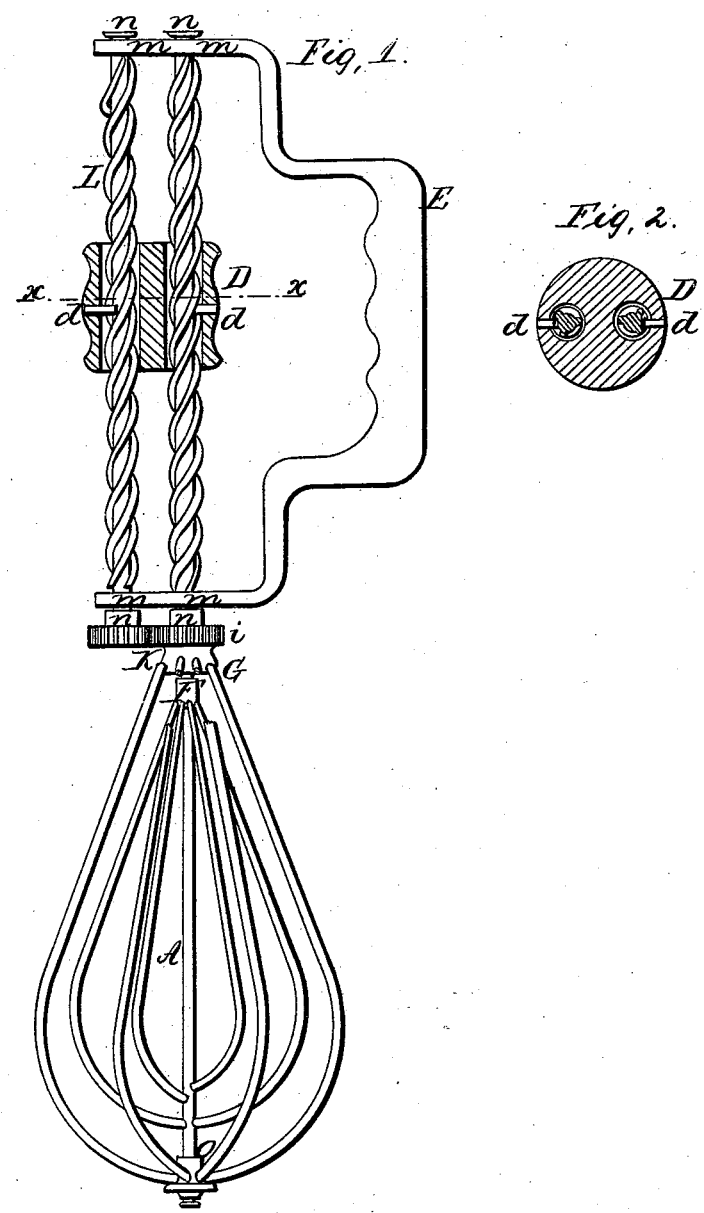

WILLIAM N. ANGUS, OF MORRISTOWN, NEW JERSEY.

Letters Patent No. 76,970, dated April 21, 1868.

IMPROVED EGG-BEATER.

The Schedule referred to in these Letters Patent and making part of the same.

TO ALL WHOM IT MAY CONCERN:

Be it known that I, WILLIAM N. ANGUS, of Morristown, in the county of Morris, and State of New Jersey, have invented a new and useful Improvement in Egg-Beaters; and I do hereby declare that the following is a full, clear, and exact description thereof, which will enable others skilled in the art to make and use the same, reference being had to the accompanying drawings, forming part of this specification, in which—

Figure 1 represents a longitudinal view of the machine, partly in section.

Figure 2 is a cross-section through the line $x\ x$ of fig. 1.

Similar letters of reference indicate like parts.

This invention relates to an improvement in machines for beating up eggs for various culinary purposes, which machines or beaters are operated by hand, and it consists in imparting the rotating motion to revolving open wire cones in a novel and simple manner, whereby the motion of the cones is reversed at every stroke or movement of the hand of the operator, and the object desired is effected in a superior manner, and in the shortest possible space of time that such an operation can be performed.

This machine for beating eggs consists of two open wire cones, which are revolved in opposite directions, one within the other. The inner cone is attached to a screw or spiral-threaded shaft, which is supported by a properly-constructed frame, which frame serves as a handle for holding it in position. The outer cone is revolved around the said shaft and around the inner cone.

A is the main shaft, which is in the form of a screw or spiral of very long pitch. The screw may be formed by wire around a rod, as seen in the drawing, or by twisting, or in any other suitable manner. This screw or spiral shaft is revolved by a nut or burr, which has a point or stub, $d$, within, as seen in the section, which point enters the space between threads or into the spiral grooves in the shaft.

D is the nut; F is the inner cone; G is the outer cone; E is the frame and handle. It will be seen that as the nut D is held in the hand, and given a motion up and down on the shaft, the shaft will be rapidly revolved. To revolve the outer cone, there is another screw or spiral shaft, H, placed parallel with the other, which passes through the same nut, and is revolved by the same means and in the same direction.

To connect the two together so that they shall be given a simultaneous movement, and to reverse the motion of the cones, there are two cog-wheels, $i$ and $j$, which engage with each other. $i$ is attached to the thimble $k$ of the outer cone, and $j$ is attached to the end of the screw on spiral shaft L, as seen in the drawing.

The two spiral shafts, A and L, have their bearings in the frame E at the places marked $m$, and longitudinal motion is prevented by suitable collars, as seen at $n$. The main spiral shaft A extends through the thimble on the outer end of the outer cone, in which A revolves, as seen at $o$.

I am aware that the two wire cones have been employed for this purpose before; therefore I do not claim the cones, nor the manner of their construction. I am also aware that the two cones have been revolved in opposite directions for this purpose, but I am not aware that they have ever been revolved or operated so as to have the motion of each reversed at each stroke or movement of the nut D up and down, while they revolve in opposite directions at all times.

Having thus described my invention, I claim as new, and desire to secure by Letters Patent—

The screw or spiral-threaded shafts A and L, cog-wheels $i$ and $j$, and the nut D, in combination with an egg-beater, constructed, arranged, and operating substantially as described and for the purpose set forth.

The above specification of my invention signed by me, this 14th day of March, 1868.

WILLIAM N. ANGUS.

Witnesses:
WM. F. MCNAMARA,
ALEX. F. ROBERTS.